Sept. 12, 1967 W. GERLACH ET AL 3,341,378

PROCESS FOR THE PRODUCTION OF ELECTRICALLY UNSYMMETRICAL SEMICONDUCTING DEVICE

Filed Dec. 9, 1963

Inventors

WILLI GERLACH

GÜNTER KÖHL

WINFRIED MONCH

By Toulmin & Toulmin

Attorneys

United States Patent Office 3,341,378
Patented Sept. 12, 1967

3,341,378

PROCESS FOR THE PRODUCTION OF ELECTRICALLY UNSYMMETRICAL SEMICONDUCTING DEVICE

Willi Gerlach, Frankfurt am Main-Eschersheim, Günter Köhl, Konigstein, Taunus, and Winfried Mönch, Neu-Isenburg, Schonbornring, Germany, assignors to Licentia Patent-Verwaltungs-G.m.b.H., Frankfurt am Main, Germany Filed Dec. 9, 1963, Ser. No. 328,893
Claims priority, application Germany, Dec. 19, 1962, L 43,741
4 Claims. (Cl. 148—187)

Figure 1:
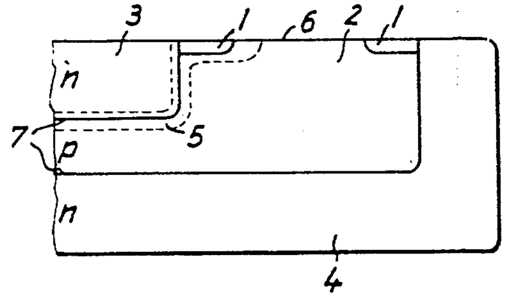

This invention relates to electrically unsymmetrical conducting systems of the nature that are employed in the manufacture of transistors, controlled rectifiers, and other unsymmetrical multiple layer solid state semi-conducting devices.

With reference to systems and devices of the nature referred to, a most important consideration in the manufacture of the device is the control of the barrier layer between adjacent layers. This barrier layer has predictable electrical characteristics that can be closely controlled during the manufacture, but at the surface of the device where the edge of the barrier layer is exposed to the atmosphere, certain formations referred to as "channels" can be poduced by the action of the surrounding atmosphere. The production of channels in this manner is not controllable so that when these undesirable channels are formed the resutling device can be possessed of a surface conductivity which makes it impossible to produce the device within the precise controlled limits desirable, specifically, devices having the required exact barrier potential characteristics.

With reference to the formation of the channels, they can have either a favorable or unfavorable effect on the operation of the device, depending upon the direction of formation of the channel. For example, if a channel is formed on the surface of a device at a pn junction in such a manner that the barrier layer between adjacent layers of the device is expanded, the field intensity in that region will be diminished, and the critical field intensity which will produce avalanche breakdown of the device at a certain barrier potential will be substantially greater than otherwise.

As is known, the volume breakthrough of a device of this nature is determined by the impurities introduced into the material of the layers and by the nature of the barrier layer. Breakdown at the surface of the device, however, can be influenced by the thickness of the barrier layer. Thus, by suitable control of the surface conductivity of such a device, the voltage required for a breakthrough at the surface can be caused to be higher than that which was determined during the manufacturing process of the device. Under these conditions only the voltage determined during the manufacturing process need be taken into consideration during the production of the elements.

The present invention therefore contemplates increasing the specific resistance across the barrier layer at and immediately beneath the surface of the device thereby to widen the barrier layer at the surface to a width greater than the width of the barrier layer internally of the device, whereby the critical field intensity at the surface of the device is higher than it is in the interior of the device.

A specific object of the present invention is the provision in multiple layer solid state semi-conducting devices of a control of the channeling characteristics of the device at the surface regions of the barrier layer or layers.

More specifically, an object of this invention is the provision of a method of increasing the effective width of the barrier layer in a multiple layer semi-conductor at the regions of the barrier layer at the surface of the device.

A further object of this invention is the provision of a method of diffusing impurities into a semi-conductor device at the surface regions of the barrier layer, thereby effectively to widen the barrier layer at that point and thus to decrease the field intensity in that region of the device.

In the practice of the present invention, there is first prepared a semi-conducting element formed of three or four semi-conducting layers which layers have been treated with n-type and p-type impurities so that the *n* regions and *p* regions alternate. At the surface of the element, at least in those regions where the barrier layer meets the surface, and immediately beneath the surface at these places, the conductivity of the material is changed in such a manner that the field intensity in these regions is diminished. The treatment can either be of the p-type material or of the n-type material and consists, specifically, of diffusing impurities of the p-type into the n-type layer or vice versa in the regions specified above.

Figure 2:
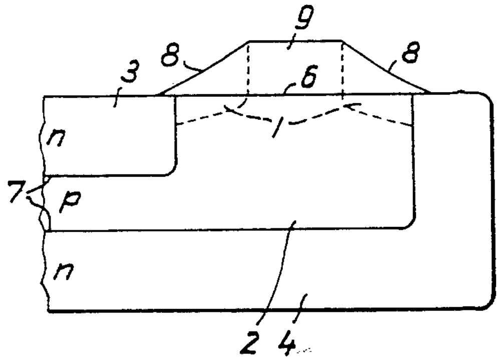

The nature of the present invention will be more clearly understood upon reference to the following specification taken in connection with the accompanying drawings, in which:

FIGURE 1 shows diagrammatically one manner of practicing the present invention, and FIGURE 2 shows diagrammatically a second method by which the present invention can be practiced.

FIGURE 1 shows a semi-conductor device in which there is indicated by reference numeral 1 the channel formations which are formed in accordance with the principles of the present invention. These channel regions are of a definite controlled configuration and have definite predicatable characteristics so that the resulting device, because of these channel formations, will have accurately predictable and stable characteristics.

These channel regions are formed at the surface region of the p-conducting part 2 of a three layer system of an npn device made up of layers 2, 3, and 4 respectively as shown in the drawings.

In FIGURE 1 it will be seen that when voltage is applied to junction 7 the charge will be distributed over a greater area at the surface than in the interior of the device so that the field intensity will be less at the surface than in the interior. This comes about, of course, because of the channels 1 referred to above, and which are regions in the p-type layer 2 that have been formed by diffusing into this material adjacent the barrier layers the n-type impurity that is contained in the n-type 3 and 4 layers.

FIGURE 2 shows a different manner in which the invention can be practiced and therein there is an npn device having layers 2, 3 and 4, and wherein the *p* conducting layer 2 has phosphorous diffused into its outer regions at the corners indicated by reference numeral 1. A device of this nature can be produced by the known oxide masking method, and as mentioned before, can be used as the initial element for the manufacture of transistors and the like, controlled rectifiers and other unsymmetrical multiple layer solid state semi-conducting devices.

By the oxide masking method it is possible to control the infusion of the impurity into layer 2 by regulating the thickness of the oxide layer which is designated by reference numeral 9.

According to the present invention, the oxide layer in the region of barrier layer 7 is of such a thickness that the *n* type impurity of the type in layers 3 and 4 will diffuse into middle layer 2 whereby the transition regions or channels regions 1 will have a lower conductivity than the barrier layer regions inside the device.

The marginal portion 8 of the oxide layer can be formed so as to slope off at an angle in any known manner, by etching, for example, and it is contemplated that in the practice of the present invention, the middle region of the oxide layer will have a thickness of from 0.8 to 2.5 microns while the marginal portions 8 of the layer will slope off at an angle of from 0.2 to 2°. By so controlling the oxide layer, the formation of the channels 1 can be controlled and the electrical characteristics of the device being treated can thus be determined and stabilized.

It will be understood that the present invention is applicable to substantially any type of semi-conductor. The common basic materials from which semi-conductors are formed may comprise germanium, silicon, selenium and the impurities that are added thereto to give the layers of the device made up from these materials their respective qualities, namely, to make the layer material of the n-type or p-type, can be selected, for example, from a pentavalent group that includes phosphorous, arsenic, antimony or from a trivalent group that includes aluminum, gallium and indium.

It will be understood that this invention is susceptible to modification in order to adapt it to different usages and conditions; and accordingly, it is desired to comprehend such modifications within this invention as may fall within the scope of the appended claims.

What we claim is:

1. A method of manufacturing electrically unsymmetrical conducting devices having at least three layers of alternately different conducting zones, each of which extends to a common plane, and the middle zone acting as a barrier layer between the other two zones comprising the steps of applying oxide material to the surface of the barrier layer containing an impurity, the surface of the oxide sloping toward the common plane at the pn-junctions, diffusing an impurity opposite in conductivity to that contained in the barrier layer and thereby effectively modifying the conductivity of the surface of the barrier layer in the region adjacent to the pn-junctions and also effectively widening the zone adjacent the barrier layer just beneath the surface of the common plane to reduce the field intensity occurring in said region when a potential is applied to the semiconductor.

2. The method according to claim 1 in which said oxide material has a thickness of from 0.8 to 2.5 microns and has its marginal edges sloping off toward the device at an angle of from 0.2 of a degree to 2 degrees, and wherein each of said sloped marginal portions of the oxide material edge extend over a different one of two consecutive pn junctions of the device, the said sloped marginal portions of said oxide material being provided by etching the said portions of the oxide material.

3. A method as defined in claim 1 wherein said oxide material has a thickness of 0.8–2.5 microns outside such partial area and is inclined at an angle of 0.2–2° within the partial area.

4. A method as defined in claim 1 wherein the sloped portion of the oxide material is formed by etching an oxide material of uniform thickness.

References Cited

UNITED STATES PATENTS

| | | | |
|---|---|---|---|
| 3,054,034 | 9/1962 | Nelson | 148—332 |
| 3,210,225 | 10/1965 | Brixey | 148—187 |

HYLAND BIZOT, *Primary Examiner.*